(12) United States Patent
Fukuda et al.

(10) Patent No.: US 9,204,507 B2
(45) Date of Patent: Dec. 1, 2015

(54) LED LIGHTING DEVICE

(71) Applicant: Sharp Kabushiki Kaisha, Osaka-shi, Osaka (JP)

(72) Inventors: Shogo Fukuda, Osaka (JP); Tomoyuki Ichiza, Osaka (JP); Toshimasa Ogawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/370,166

(22) PCT Filed: Sep. 21, 2012

(86) PCT No.: PCT/JP2012/074203
§ 371 (c)(1),
(2) Date: Jul. 1, 2014

(87) PCT Pub. No.: WO2013/111377
PCT Pub. Date: Aug. 1, 2013

(65) Prior Publication Data
US 2014/0368129 A1 Dec. 18, 2014

(30) Foreign Application Priority Data

Jan. 26, 2012 (JP) .................................. 2012-014293
Sep. 6, 2012 (JP) .................................. 2012-196260
Sep. 6, 2012 (JP) .................................. 2012-196262

(51) Int. Cl.
*H05B 37/02* (2006.01)
*H05B 33/08* (2006.01)

(52) U.S. Cl.
CPC ........ *H05B 33/0815* (2013.01); *H05B 33/0818* (2013.01); *Y02B 20/343* (2013.01); *Y02B 20/345* (2013.01)

(58) Field of Classification Search
CPC .............................. H05B 33/083; H05B 37/02
USPC .............. 315/297, 121, 122, 123, 185 R, 307
See application file for complete search history.

(56) References Cited

U.S. PATENT DOCUMENTS 8,008,864 B2 * 8/2011 Nguyen et al. ................. 315/122
2007/0159750 A1 * 7/2007 Peker et al. ................... 361/93.1
2011/0068701 A1 3/2011 van de Ven et al.

FOREIGN PATENT DOCUMENTS

JP 2006-139755 A 6/2006
JP 2009-238633 A 10/2009
JP 2010-257718 A 11/2010

* cited by examiner

*Primary Examiner* — Daniel D Chang
(74) *Attorney, Agent, or Firm* — Birch, Stewart, Kolasch & Birch, LLP

(57) ABSTRACT

This LED lighting device makes a maximum current to minimum current flowing in an LED a target proportion regardless of LED driving circuit performance and without erroneous operation. An LED lighting device (1) is provided with: an LED circuit (5) that includes at least one LED (1-5); a bypass means (6a) inserted in parallel with the LEDs (1-5); and an LED driving circuit (4) that supplies current by duty control to the LEDs (1-5) and the bypass means (6a). When a prescribed minimum current flows in the LED circuit (5), the LED driving circuit (4) supplies current in which a portion of current flowing in the bypass means (6a) is added to this minimum current and carries out control of the added current by a switching element (TR1) connected in series to the LED circuit (5) and the bypass means (6a).

11 Claims, 7 Drawing Sheets

LED LIGHTING DEVICE

TECHNICAL FIELD

The present invention relates to an LED lighting device and, more particularly, to an LED lighting device to turn on a light emitting diode (LED) used in a backlight light source of a liquid crystal displaying apparatus.

BACKGROUND OF THE INVENTION

Various manufacturers have put on the market liquid crystal displaying apparatuses each using light emitting diodes (LED) as its backlight light source. The LED is a semiconductor element that emits light when a voltage is applied thereto in the forward direction thereof. When a positive voltage and a negative voltage are respectively applied to the anode and the cathode of the LED, a current flows in the LED at a voltage of several volts and the LED emits light. Control of turning on and off of, and control of the brightness of the backlight are enabled for each area by using the LEDs as the backlight light source and, therefore, the contrast can significantly be improved. The LED has a longer life and needs a smaller power consumption than those of a traditional fluorescent tube and, therefore, has an advantage of a higher energy-saving effect than that thereof.

When the LEDs are used as a backlight light source especially of a large-screen display, electric currents need to be supplied to many LEDs and, therefore, feedback control is executed to keep the current flowing in each of the LEDs constant (current feedback) using the LED power source as a switching power source (see, e.g., Patent Document 1).

FIG. 7 is a diagram of the configuration of a traditional LED lighting device and "100" therein denotes the LED lighting device. The LED lighting device 100 includes a converter circuit 2 including a switching power source 3, an LED driving circuit 4 to drive LEDs (1 to 5) of an LED circuit 5, and the LED circuit 5 including the plural LEDs (1 to 5). The LED driving circuit 4 is mounted as an integrated circuit (IC) chip including a known microcomputer and peripheral circuits. An output of a signal from the LED driving circuit 4 to an external circuit is controlled by the microcomputer.

The LED driving circuit 4 receives a dimming control signal from a main control portion (not depicted) to control a dimming duty ratio to a predetermined dimming duty ratio. The LED driving circuit 4 outputs a duty signal based on the dimming duty ratio from its feedback output terminal to the converter circuit 2, controls a start of the operation and discontinuation of the operation of the switching power source 3, and causes the switching power source 3 to generate a voltage V1 corresponding to the dimming duty ratio. The LED driving circuit 4: causes a switching element TR1 inserted between the LED circuit 5 and a ground line GND to be driven for switching based on the duty signal; causes the voltage V1 to continuously be applied to the LED circuit 5; and, thereby, causes the LEDs (1 to 5) to be turned on. The switching element TR1 is composed of, for example, a field effect transistor (FET).

The converter circuit 2 generates the voltage V1 to turn on the LEDs (1 to 5) included in the LED circuit 5 based, for example, on a reference voltage V generated from the power source voltage (+B) such as a battery. Though the converter circuit 2 is configured as a what-is-called step-down converter including a capacitor C, the converter circuit 2 may be of any one of a step-down, a step-up, and a step-up-and-down types.

The LED circuit 5 includes one or more LEDs. In the depicted example, the LED circuit 5 includes five LEDs of LEDs (1 to 5). An electric current i flowing in the LED circuit 5 is converted from a current to a voltage by a current detection resistor R1 and the voltage is input into a current detection terminal of the LED driving circuit 4. The LED driving circuit 4 outputs the value of the voltage input into the current detection terminal from its feedback output terminal to the converter circuit 2, and causes the converter circuit 2 to drive the LEDs (1 to 5) each with a constant current.

The image quality of recent liquid crystal displaying apparatuses is increasingly improved and a demand is present that the contrast ratio is increased as much as possible, to acquire clearer image quality. When LEDs are used as the backlight, the contrast ratio is determined based on the ratio of the maximal luminance and the minimal luminance of the LEDs. An increase of the contrast ratio is equivalent to an increase of the ratio of the maximal current: (the rated current) and the minimal current that flow in the LEDs.

The current flowing in the LEDs is determined by a current supplied by the LED driving circuit as described with reference to FIG. 7. The manufacturers of the liquid crystal displaying apparatuses each set target ratio of the maximal current to the minimal current to be caused to flow in the LEDs, to realize the desired contrast ratio. For example, the target ratio is set to be 2000:1. For example, when the maximal current supplied by the LED driving circuit is 250 mA, the target value of the minimal current is 0.125 mA.

PRIOR ART DOCUMENT

Patent Documents

Patent Document 1: Japanese Laid-Open Patent Publication No. 2009-238633

SUMMARY OF THE INVENTION

Problem to be Solved by the Invention

Two methods are traditionally used to realize the minimal current to be caused to flow in the LEDs (hereinafter, referred to as "LED minimal current"). A method is present as the first method according to which a main control portion adjusts a dimming control signal (the dimming duty) and the LED driving circuit generates the LED minimal current based on the dimming duty after the adjustment. However, in this case, the main control portion needs to execute complicated signal adjustment, and a problem arises that the performance of the LED driving circuit, that is, the range of the dimming duty that the LED driving circuit can handle restricts the LED minimal current. This will be described with reference to FIG. 8.

FIG. 8 is a diagram of the relation between the current flowing in the LED and the dimming duty. The axis of ordinate therein represents the current flowing in the LED (unit: mA) and the axis of abscissa therein represents the dimming duty (%). A graph L1 shows the correspondence relation between the dimming duty and the current flowing in the LED (that is, the current supplied by the LED driving circuit). As depicted in FIG. 8, when the dimming duty is equal to or lower than 0.1% (in FIG. 8, in a range indicated by "X"), it can be seen that: the operation is not guaranteed due to the performance of the LED driving circuit; and, therefore, the target 0.125 mA cannot be achieved. With this performance of the LED driving circuit, when the dimming duty is 0.1%, the current flowing in the LED (the minimal current) is 0.200 mA and, therefore, the target 0.125 mA cannot be achieved.

Another method is present as the second method according to which an external circuit of the LED driving circuit realizes the LED minimal current. However, in this case, the LED driving circuit is caused to discontinue its operation and the external circuit generates the LED minimal current and, therefore, the LED driving circuit may malfunction when the LED driving circuit recovers its operation. For example, when the LED driving circuit whose operation is discontinued is caused to precipitously recover its operation, the LED voltage is increased. Therefore, this increase of the LED voltage is mistakenly detected as an excess voltage error.

According to the technique described in Patent Document 1, though a bypassing circuit is inserted in parallel to the LED circuit: this aims at reducing the time period necessary for the LED to be turned on; this is adapted to prevent turning on of the LED by supplying electric power to the bypassing circuit when the switching power source is driven with a pre-duty ratio; and this is also adapted to prevent the bypassing circuit from operating by supplying electric power to the LED when the switching power source is driven with the dimming duty ratio. Therefore, according to the technique described in Patent Document 1, the ratio of the maximal current to the minimal current caused to flow in the LED cannot be set to be the target ratio to acquire the desired contrast ratio.

The present invention was conceived in view of the above circumstances and an object thereof is to provide an LED lighting device that can set the ratio of the maximal current to the minimal current caused to flow in the LED to be the target ratio regardless of the performance of the LED driving circuit and without any malfunctioning thereof.

Means for Solving the Problem

To solve the above problems, a first technical means of the present invention is an LED lighting device comprising: an LED circuit that comprises at least one LED; a bypassing circuit that is inserted in parallel to the LED ciruit; and an LED driving circuit that supplies a current to each of the LED circuit and the bypassing circuit, wherein when a predetermined current is caused to flow in the LED circuit, the LED driving circuit supplies a current acquired by adding the current to flow in the bypassing circuit to the predetermined current, and wherein the current acquired by the addition is controlled by a switching circuit connected in series to the LED circuit.

A second technical means is the LED lighting device comprising: an LED circuit that comprises at least one LED; a bypassing circuit that is inserted in parallel to the LED circuit; and and LED driving circuit that supplies a current to each of the LED circuit and the bypassing circuit, wherein when a predetermined current is caused to flow in the LED circuit, the LED driving circuit supplies a current acquired by adding the current to flow in the bypassing circuit to the predetermined current, and wherein the current acquired by the addition is controlled by a switching circuit connected in series to the LED circuit and the bypassing circuit.

A third technical means is the LED lighting device of the second technical means, wherein when a predetermined maximal current is caused to flow in the LED circuit, the LED driving circuit supplies a current acquired by adding the current to flow in the bypassing circuit to the predetermined maximal current.

A fourth technical means is the LED lighting device of the second technical means, wherein the bypassing circuit is a resistor.

A fifth technical means is the LED lighting device of the second technical means, wherein the bypassing circuit comprises at least one bypass line having therein a resistor and another switching circuit connected in series to each other, and wherein when the predetermined current is caused to flow in the LED circuit, the other switching circuit is caused to operate and the LED driving circuit supplies a current acquired by adding the current to flow in the bypassing circuit to the predetermined current.

A sixth technical means is the LED lighting device of the fifth technical means, wherein when a predetermined maximal current is caused to flow in the LED circuit, the other switching circuit is caused to stop operation and the LED driving circuit supplies the predetermined maximal current.

A seventh technical means is the LED lighting device of the fifth technical means, wherein the bypassing circuit comprises the plurality of bypass lines connected in parallel to each other.

An eighth technical means is the LED lighting device of the second technical means, wherein the bypassing circuit comprises a semiconductor element, and wherein when the predetermined current is caused to flow in the LED circuit, the semiconductor element is caused to operate and the LED driving circuit supplies a current acquired by adding the current to flow in the bypassing circuit to the predetermined current.

A ninth technical means is the LED lighting device of the eighth technical means, wherein when the predetermined maximal current is caused to flow in the LED circuit, the semiconductor element is caused to stop operation and the LED driving circuit supplies the predetermined maximal current.

A tenth technical means is the LED lighting device of eighth technical means, wherein the semiconductor element is a field-effect transistor, and wherein the current to flow in the bypassing circuit is controlled by controlling a gate-source voltage of the field-effect transistor.

An eleventh technical means is the LED lighting device of the second technical means, wherein the predetermined maximal and the predetermined mininmal currents to be caused to flow in the LED circuit have a predetermined ratio.

A twelfth technical means is the LED lighting device of the second technical means, wherein the LED driving circuit supplies a current through duty control.

Effect of the Invention

According to the present invention, a bypassing circuit is inserted in parallel to an LED and, thereby, the current supplied by the LED driving circuit can be branched to the bypassing circuit such that the current caused to flow in the LED becomes the target minimal current. Therefore, the ratio of the maximal current to the minimal current caused to flow in the LED can be set to be the target ratio regardless of the performance of the LED driving circuit and without any malfunctioning of the LED driving circuit because the operation thereof is not discontinued.

PREFERRED EMBODIMENT OF THE INVENTION

Preferred embodiments will be described according to an LED lighting device of the present invention with reference to the accompanying drawings. For example, the LED) lighting device is incorporated in a liquid crystal displaying apparatus using LEDs as its backlight light source and executes lighting control of the LEDs.

(First Embodiment)

Figure 1:
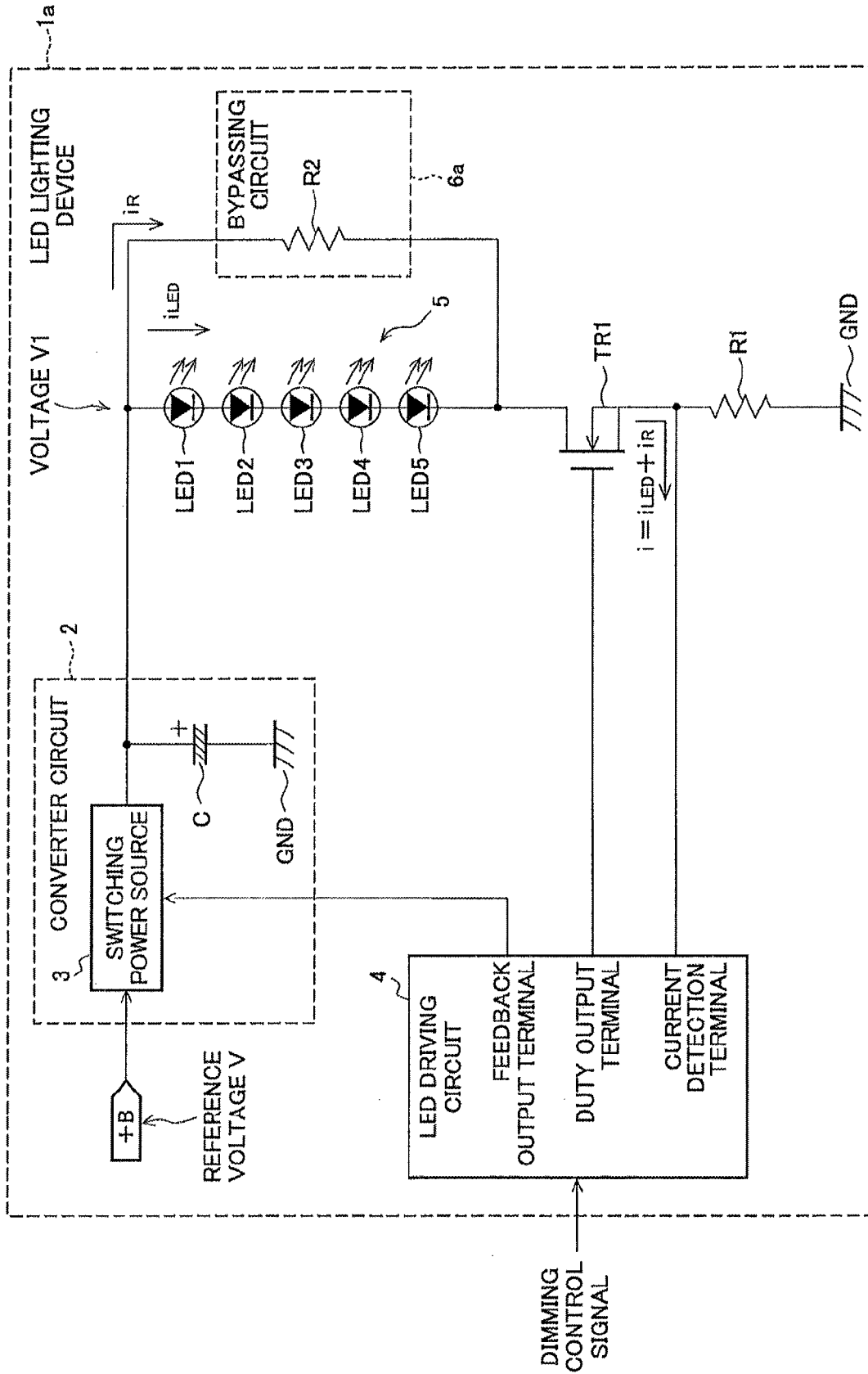
FIG. 1 is a diagram of an exemplary configuration of an LED lighting device according to a first embodiment of the present invention.
Figure 7:
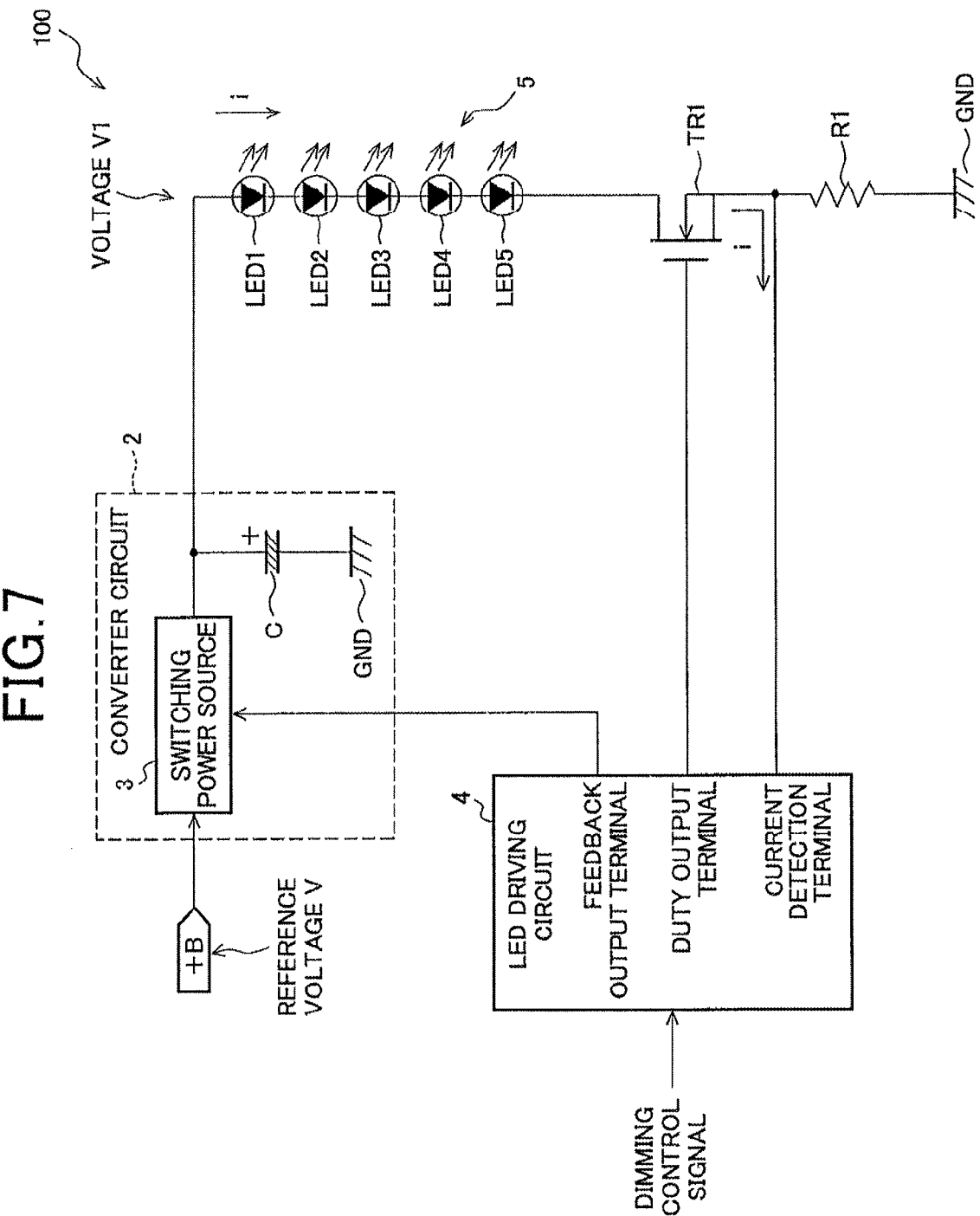
FIG. 7 is a diagram of a configuration of a traditional LED lighting device.

FIG. 1 is a diagram of an exemplary configuration of an LED lighting device according to a first embodiment of the present invention. In FIG. 1, "1a" denotes the LED lighting device. The LED lighting device 1a differs from the LED lighting device 100 described as above with reference to FIG. 7 in that the LED lighting device 1a includes a bypassing circuit 6a inserted in parallel to the LED circuit 5. In FIG. 1, components denoted by the same reference numerals as those of the components depicted in FIG. 7 have the same functions as those thereof. An exemplary operation of the LED lighting device 1a will briefly be described.

As above, the LED driving circuit 4 receives the dimming control signal to control the dimming duty ratio to the predetermined dimming duty ratio, from the main control portion (not depicted). The LED driving circuit 4 outputs the duty signal based on the dimming duty ratio from its feedback output terminal to the converter circuit 2, controls turning on and off of the switching power source 3, and causes the switching power source 3 to generate the voltage V1 corresponding to the dimming duty ratio. The LED driving circuit 4 causes the switching element TR1 (corresponding to a switching circuit) inserted between the LED circuit 5 and the ground line GND to be driven for switching based on the duty signal, causes the voltage V1 to continuously be applied to the LED circuit 5, and causes the LEDs (1 to 5) to be turned on. The switching element TR1 is composed of, for example, a field effect transistor (FET).

The converter circuit 2 generates the voltage V1 to turn on the LEDs (1 to 5) included in the LED circuit 5 based, for example, on the reference voltage V generated from the power source voltage (+B) such as a battery. Though the converter circuit 2 is configured as a what-is-called step-down converter including a capacitor C, the converter circuit 2 may be of any one of a step-down, a step-up, and a step-up-and-down types.

The LED circuit 5 includes at least one LED. In the depicted example, the LED circuit 5 includes the five LEDs of LEDs (1 to 5). The electric current i acquired by adding an electric current $i_{LED}$ flowing in the LEDs (1 to 5) to an electric current $i_R$ flowing in the bypassing circuit 6a is converted from a current into a voltage by the current detection resistor R1 and this voltage is input into the current detection terminal of the LED driving circuit 4. The LED driving circuit 4 outputs the value of the voltage input into the current detection terminal from its feedback output terminal to the converter circuit 2, and causes the converter circuit 2 to drive the LEDs (1 to 5) each with a constant current.

A primary object of the present invention is to set the ratio of the maximal current to the minimal current to be caused to flow in the LEDs, to be the target ratio regardless of the performance of the LED driving circuit and without any malfunctioning thereof. The LED lighting device 1a includes, as the configuration to achieve the object, the LED circuit 5 including the LEDs (1 to 5), the bypassing circuit 6a inserted in parallel to the LED circuit 5, and the LED driving circuit 4 to supply an electric current to each of the LED circuit 5 and the bypassing circuit 6a based, for example, on the duty control. When the LED driving circuit 4 causes a predetermined minimal current to flow in the LED circuit 5, the LED driving circuit 4 supplies an electric current acquired by adding the current to be caused to flow in the bypassing circuit 6a to this minimal current. The electric current acquired by the addition is controlled by the switching element TR1 connected in series to the LED circuit 5 and the bypassing circuit 6a.

The current supplied by the LED driving circuit 4 is branched to the bypassing circuit 6a such that the value of the current to be caused to flow in the LEDs (1 to 5) becomes the target value that is the value of the minimal current acquired when the ratio of the maximal current to the minimal current to be caused to flow in the LEDs (1 to 5) becomes predetermined ratio (also referred to as "target ratio"). The target ratio only has to be determined corresponding to the contrast ratio desired to be realized, the specification of the LED, etc., and is not especially limited while the target ratio may be, for example, 2000:1.

In the above, the LED driving circuit 4 controls turning on and off of the switching power source 3 based on the externally-input dimming control signal (the dimming duty ratio), and supplies the current i based on the voltage V1 that corresponds to the dimming duty ratio. The current i is branched at the connection point of the LEDs (1 to 5) and a resistor R2. The currents $i_{LED}$ and $i_R$ respectively flow in the LEDs (1 to 5) and the resistor R2. In this example, the case where the LED driving circuit 4 supplies the current based on the duty control is exemplified and described. However, not limited to this duty control, the same control can be executed even in the case, for example, where current control is applied.

In this example, the resistor R2 is inserted in parallel to the LEDs (1 to 5) as an example of the bypassing circuit 6a. The bypassing circuit 6a is not limited to the resistor R2 but may be an element having an impedance component and, for example, a thermistor or a transistor may be used.

Figure 8:
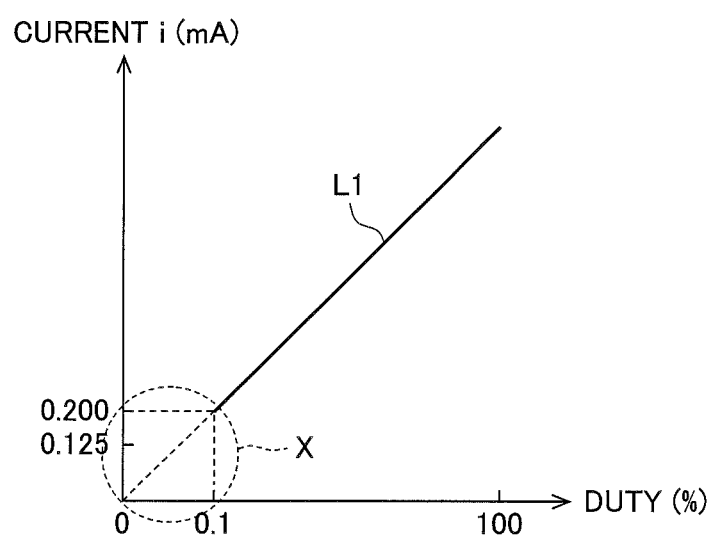
FIG. 8 is a diagram of the relation between the current flowing in the LED and the dimming duty.

In FIG. 1, the case is assumed, for example, where the target ratio of the maximal current to the minimal current to be caused to flow in the LEDs (1 to 5) is 2000:1 and the maximal current (the rated current) is 250 mA. In this case, the target value of the minimal current is 0.125 mA. As to the performance of the LED driving circuit 4 in this example, as depicted in FIG. 8, the operation thereof is not guaranteed when the dimming duty is equal to or lower than 0.1%, and 0.200 mA is supplied to the LEDs (1 to 5) when the dimming duty is, for example, 0.1%. With this performance of the LED driving circuit 4, the target value of the minimal current that is 0.125 mA cannot be achieved.

In contrast, according to the circuit configuration of this embodiment, the resistor R2 is inserted in parallel to the LEDs (1 to 5). Representing the current output from the LED driving circuit 4 as "i", the current flowing in the LEDs (1 to 5) as "$i_{LED}$", and the current flowing in the resistor R2 as "$i_R$", an equation as below holds.

$$i = i_{LED} + i_R \quad \text{Eq. (1)}$$

In Eq. (1) above, assuming that i is i=0.200 mA and $i_{LED}$ is $i_{LED}$=0.125 mA, the current $i_R$ to flow in the resistor R2 is 0.075 mA. Based on this, the resistance value of the resistor R2 can be acquired from V1/$i_R$. The voltage V1 is the voltage applied across the resistor R2 (and the LED circuit 5) and is known. In this manner, of the current i (=0.200 mA) supplied by the LED driving circuit 4, only the current $i_R$ (=0.075 mA) can be branched to the resistor R2 and, therefore, the target minimal current $i_{LED}$ (=0.125 mA) can be caused to flow in the LEDs (1 to 5).

When the LED driving circuit 4 causes the maximal current (for example, 250 mA) to flow in the LEDs (1 to 5), the LED driving circuit 4 only has to supply a current acquired by adding the current $i_R$ to be caused to flow in the resistor R2, to the maximal current. The resistance value of the resistor R2 can be determined from the above. In the circuit configuration including the resistor R2, a voltage V1' is determined in advance that is necessary for causing the maximal current (250 mA) to flow in the LEDs (1 to 5) (the dimming duty ratio). The current $i_R$ can be determined from the resistor R2 and the voltage V1'. Thereby, of the current i (=(250+$i_R$) mA) supplied by the LED driving circuit 4, only the current $i_R$ is branched to the resistor R2 and the target maximal current $i_{LED}$ (=250 mA) flows in the LEDs (1 to 5).

Figure 2:
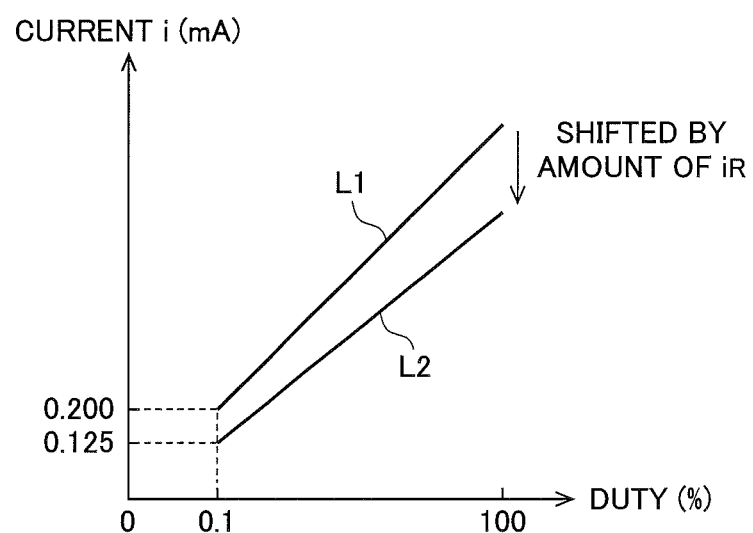
FIG. 2 is a diagram of an example of a correspondence relation between a current flowing in the LED and a dimming duty.

FIG. 2 is a diagram of an example of the correspondence relation between the current flowing in the LEDs and the dimming duty. In FIG. 2, the axis of ordinate represents the current (unit: mA) flowing in the LEDs and the axis of abscissa represents the dimming duty (%). The graph L1 is the same as that for the traditional case described above with reference to FIG. 8. A graph L2 shows the correspondence relation between the current flowing in the LEDs (1 to 5) and the dimming duty in the circuit configuration of this embodiment, and is acquired by shifting the graph L1 to be lower by the amount of the current $i_R$. According to the circuit configuration of this embodiment, as above, of the current i supplied by the LED driving circuit 4, only the current $i_R$ can be branched to the resistor R2. Therefore, the ratio of the maximal current to the minimal current of the current $i_{LED}$ to be caused to flow in the LEDs (1 to 5) can be set to be the target ratio (for example, 2000:1).

As above, according to this embodiment, the insertion of the bypassing circuit 6a in parallel to the LEDs (1 to 5) enables the current i supplied by the LED driving circuit 4 to be branched to the bypassing circuit 6a such that the current $i_{LED}$ to be caused to flow in the LEDs (1 to 5) becomes the target minimal current. Therefore, the ratio of the maximal current to the minimal current caused to flow in the LEDs (1 to 5) can be set to be the target ratio regardless of the performance of the LED driving circuit 4 and without any malfunctioning of the LED driving circuit 4 because the operation thereof is not discontinued.

When the resistor R2 is used as the bypassing circuit 6a, the resistor R2 also functions as a discharge resistance for an abnormal situation and, therefore, the circuit can be protected and the safety can be secured of the LED lighting device 1a or the liquid crystal displaying apparatus incorporating therein the LED lighting device 1a.

(Second Embodiment)

Figure 3:
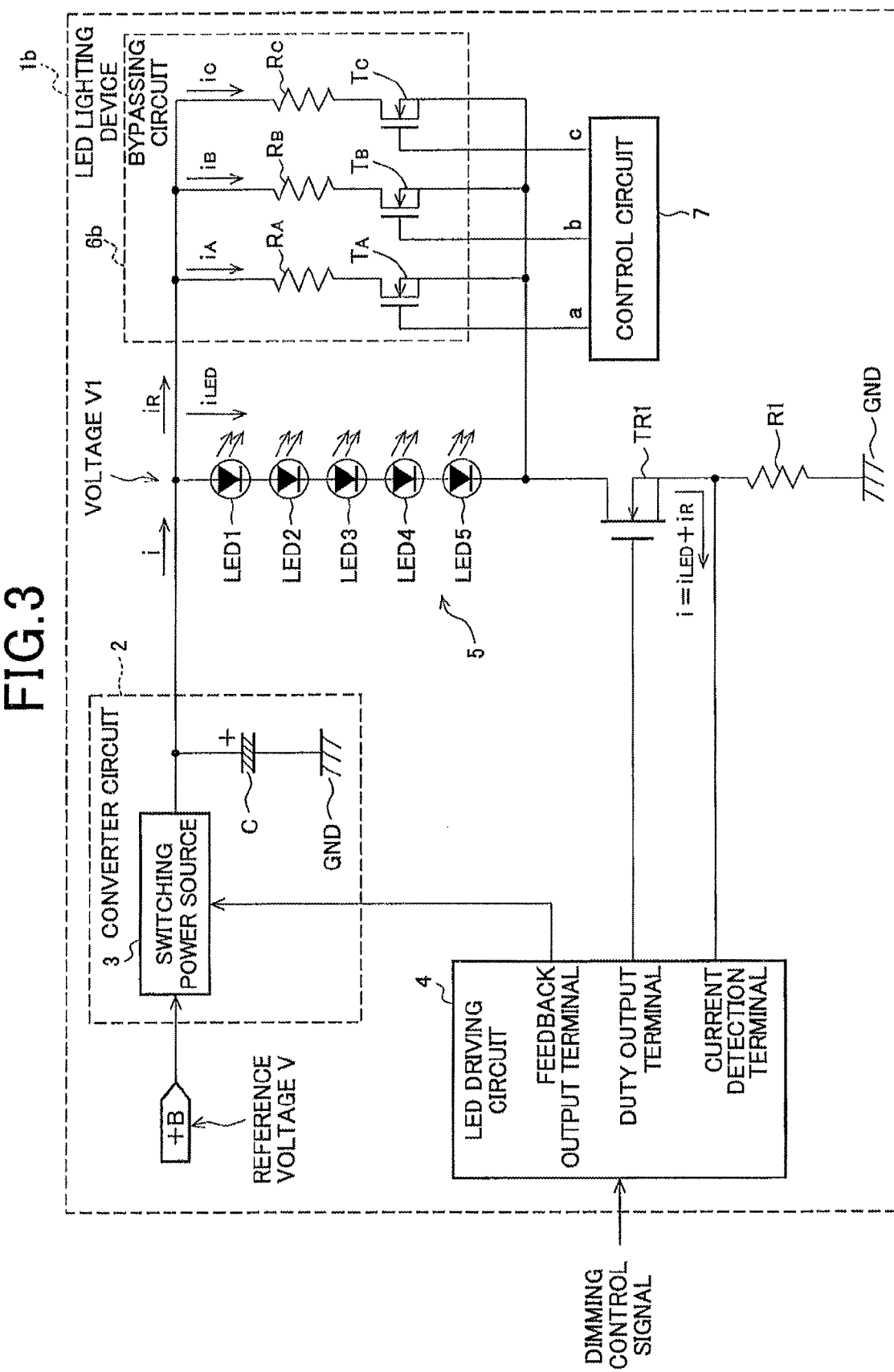
FIG. 3 is a diagram of an exemplary configuration of an LED lighting device according to a second embodiment of the present invention.

FIG. 3 is a diagram of an exemplary configuration of an LED lighting device according to a second embodiment of the present invention. In FIG. 3, "1b" denotes the LED lighting device. The LED lighting device 1b differs from the LED lighting device 100 described above with reference to FIG. 7 in that the LED lighting device 1b includes a bypassing circuit 6b inserted in parallel to the LED circuit 5 and a control circuit 7 that controls turning on and off of the bypassing circuit 6b. In FIG. 3, components denoted by the same reference numerals as those of the components depicted in FIG. 7 have the same functions as those thereof. An exemplary operation of the LED lighting device 1b will briefly be described.

As above, the LED driving circuit 4 receives the dimming control signal to control the dimming duty ratio to the predetermined dimming duty ratio, from the main control portion (not depicted). The LED driving circuit 4 outputs the duty signal based on the dimming duty ratio from its feedback output terminal to the converter circuit 2, controls turning on and off of the switching power source 3, and causes the switching power source 3 to generate the voltage V1 corresponding to the dimming duty ratio. The LED driving circuit 4 causes the switching element TR1 (corresponding to the switching circuit) inserted between the LED circuit 5 and the ground line GND to be driven for switching based on the duty signal, causes the voltage V1 to continuously be applied to the LED circuit 5, and causes the LEDs (1 to 5) to be turned on. The switching element TR1 is composed of, for example, a field effect transistor (FET).

The converter circuit 2 generates the voltage V1 to turn on the LEDs (1 to 5) included in the LED circuit 5 based, for example, on the reference voltage V generated from the power source voltage (+B) such as a battery. Though the converter circuit 2 is configured as a what-is-called step-down converter including the capacitor C, the converter circuit 2 may be of any one of a step-down, a step-up, and a step-up-and-down types.

The LED circuit 5 includes at least one LED. In the depicted example, the LED circuit 5 includes the five LEDs of LEDs (1 to 5). The current i acquired by adding an electric current $i_{LED}$ flowing in the LEDs (1 to 5) to an electric current $i_R$ flowing in the bypassing circuit 6b is converted from a current into a voltage by the current detection resistor R1 and this voltage is input into the current detection terminal of the LED driving circuit 4. The LED driving circuit 4 outputs the value of the voltage input into the current detection terminal from its feedback output terminal to the converter circuit 2, and causes the converter circuit 2 to drive the LEDs (1 to 5) each with a constant current.

The LED lighting device 1b of this embodiment includes the LED circuit 5 including the LEDs (1 to 5), the bypassing circuit 6b inserted in parallel to the LED circuit 5, and the LED driving circuit 4 that supplies a current to the LED circuit 5 and the bypassing circuit 6b based, for example, on the duty control. When the LED driving circuit 4 causes a predetermined minimal current to flow in the LED circuit 5, the LED driving circuit 4 supplies a current acquired by adding the current to flow in the bypassing circuit 6b to this minimal current. The current acquired by the addition is controlled by the switching element TR1 connected in series to the LED circuit 5 and the bypassing circuit 6b.

The current supplied by the LED driving circuit 4 is branched to the bypassing circuit 6b such that the value of the current to be caused to flow in the LEDs (1 to 5) becomes the target value that is the value of the minimal current acquired when the ratio of the maximal current to the minimal current to be caused to flow in the LEDs (1 to 5) become predetermined ratio (also referred to as "target ratio"). The target ratio only has to be determined corresponding to the contrast ratio desired to be realized, the specification of the LED, etc., and is not especially limited while the target ratio may be, for example, 2000:1.

In the above, the LED driving circuit 4 controls turning on and off of the switching power source 3 based on the externally-input dimming control signal (the dimming duty ratio), and supplies the current i based on the voltage V1 that corresponds to the dimming duty ratio. The current i is branched at the connection point of the LEDs (1 to 5) and the bypassing circuit 6b. The currents $i_{LED}$ and $i_R$ respectively flow in the LEDs (1 to 5) and the bypassing circuit 6b. In this example, the case where the LED driving circuit 4 supplies the current based on the duty control is exemplified and described. However, not limited to this duty control, the same control can be executed even in the case, for example, where current control is applied.

An exemplary configuration of the bypassing circuit 6b will be described. The bypassing circuit 6b includes at least one bypass line having therein a resistor and a switching element connected to each other in series. In the example of FIG. 3, the bypassing circuit 6b: includes a bypass line having therein a resistor $R_A$ and a switching element $T_A$ connected to each other in series, a bypass line having therein a resistor $R_B$ and a switching element $T_B$ connected to each other in series, and a bypass line having therein a resistor $R_C$ and a switching element $T_C$ connected to each other in series; and has therein these three bypass lines connected in parallel to each other. The switching elements $T_A$ to $T_C$ each correspond to another switching circuit, and are each composed of, for example, an field-effect transistor (FET) or, more preferably, a metal-oxide-semiconductor filed-effect transistor (MOSFET).

Representing the current output from the LED driving circuit 4 as "i", the current flowing in the LEDs (1 to 5) as "$i_{LED}$", a current flowing in the bypassing circuit 6b as "$i_R$", a current flowing in the bypass line including the resistor $R_A$ as "$i_A$", a current flowing in the bypass line including the resistor $R_B$ as "$i_B$", and a current flowing in the bypass line including the resistor $R_C$ as "$i_C$", an equation as below holds.

$$i = i_{LED} + i_R, \text{ where } i_R = i_A + i_B + i_C \qquad \text{Eq. (2)}$$

The control circuit 7 is connected to the switching elements $T_A$ to $T_C$ and controls turning on and off (operation and discontinuation of the operation) of each of the switching elements $T_A$ to $T_C$. For example, when all of the switching elements $T_A$ to $T_C$ are turned on, the current flowing in the LEDs (1 to 5) is acquired as $i_{LED} = i - (i_A + i_B + i_C)$ from Eq. (2). Similarly, when the switching element $T_A$ is turned off and the switching elements $T_B$ and $T_C$ are turned on, the current flowing in the LEDs (1 to 5) is acquired as $i_{LED} = i - (i_B + i_C)$. When the switching elements $T_A$ and $T_B$ are turned off and the switching element $T_C$ is turned on, the current flowing in the LEDs (1 to 5) is acquired as $i_{LED} = i - i_C$. When all of the switching elements $T_A$ to $T_C$ are turned off, the current flowing in the LEDs (1 to 5) is acquired as $i_{LED} = i$.

In FIG. 3, the case is assumed, for example, where the target ratio of the maximal current to the minimal current to be caused to flow in the LEDs (1 to 5) is 2000:1 and the maximal current (the rated current) is 250 mA. In this case, the target value of the minimal current is 0.125 mA. When the minimal current is caused to flow, it is assumed, for example, that control is executed to turn off the switching elements $T_A$ and $T_B$ and to turn on the switching element TC. When the minimal current is caused to flow, the relation $i_{LED} = i - i_C$ holds. As depicted in FIG. 8, as to the performance of the LED driving circuit 4 in this example, the operation is not guaranteed when the dimming duty is equal to or lower than 0.1%, and 0.200 mA is supplied to the LEDs (1 to 5) when the dimming duty is, for example, 0.1%. With this performance of the LED driving circuit 4, the target value of the minimal current that is 0.125 mA cannot be achieved.

Assuming that i and $i_{LED}$ are i=0.200 mA and $i_{LED}$=0.125 mA in Eq. (2) above, the current $i_C$ to flow in the resistor $R_C$ is 0.075 mA. Based on this, the resistance value of the resistor $R_C$ can be acquired from V1/$i_C$. The voltage V1 is the voltage applied across the resistor $R_C$ (and the LED circuit 5) and is known. In this manner, of the current i (=0.200 mA) supplied by the LED driving circuit 4, only the current $i_C$ (=0.075 mA) can be branched to the resistor $R_C$ by executing the control to turn on only the switching element $T_C$. Therefore, the target minimal current $i_{LED}$ (=0.125 mA) can be caused to flow in the LEDs (1 to 5).

In the above example, the minimal current is adapted to flow in the LEDs (1 to 5) by executing the control to turn off the switching elements $T_A$ and $T_B$ and to turn on the switching element $T_C$. However, the minimal current may be adapted to flow in the LEDs (1 to 5) by executing control to turn on any one or more of the switching elements $T_A$, $T_B$, and $T_C$.

When the maximal current (for example, 250 mA) is caused to flow in the LEDs (1 to 5), control is executed to turn off all of the switching elements $T_A$ to $T_C$. No current flows in the resistors $R_A$ to $R_C$ and, therefore, the relation $i_{LED} = i$ holds. Therefore, the LED driving circuit 4 only has to supply the maximal current as it is. Thereby, the target maximal current $i_{LED}$ (=250 mA) flows in the LEDs (1 to 5).

When the bypassing circuit 6b is composed only of the resistors, a current always flows in the bypassing circuit 6b. Therefore, even when the maximal current is caused to flow in the LEDs (1 to 5), the LED driving circuit 4 needs to supply a current acquired by adding a current to be supplied to the bypassing circuit 6b to the maximal current and, the added current is lost. In contrast, in this embodiment, the bypassing circuit 6b is composed of the resistors and the switching elements. Therefore, when the maximal current is caused to flow in the LEDs (1 to 5), no current can be caused to flow in the resistors by turning off the switching elements. Thereby, the LED driving circuit 4 only has to supply the maximal current as it is and, therefore, the above loss does not occur.

The correspondence relation between the current flowing in the LEDs and the dimming duty will be described with reference to FIG. 2. The graph L1 is the same as that for the traditional case described above with reference to FIG. 8. A graph L2 shows the correspondence relation between the current flowing in the LEDs (1 to 5) and the dimming duty in the circuit configuration of this embodiment, and is acquired by shifting the graph L1 to be lower by the amount of the current $i_R$ (in this example, $i_R = i_C$). According to the circuit configuration of this embodiment, as above, of the current i supplied by the LED driving circuit 4, only the current $i_C$ can be branched to the resistor $R_C$. Therefore, the ratio of the maximal current to the minimal current of the current $i_{LED}$ to be caused to flow in the LEDs (1 to 5) can be set to be the target ratio (for example, 2000:1).

Another example of this embodiment will be described with reference to FIG. 3 described above. In this example, it is assumed in the ordinary state that the maximal current of the current $i_{LED}$ flowing in the LEDs (1 to 5) is, for example, 200 mA and the minimal current controllable by the LED driving circuit 4 is, for example, 1 mA. It is also assumed in this example that V1, $R_A$, $R_B$, and $R_C$ are V1=100 V, $R_A$=110 kΩ, $R_B$=2 MΩ, and $R_C$=2.5 MΩ.

(1) When all of the switching elements $T_A$ to $T_C$ are turned off, the maximal current is 200 mA and the minimal current is 1 mA and, therefore, the ratio of the maximal current to the minimal current is 200 mA:1 mA=200:1.

(2) When the switching element $T_A$ is turned on and the switching elements $T_B$ and $T_C$ are turned off, the maximal current is 200 mA and the minimal current is acquired as below.

$$1\ mA - (100\ V/110\ k\Omega) \approx 1\ mA - 0.9\ mA \approx 0.1\ mA$$

Therefore, the ratio of the maximal current to the minimal current is 200 mA:0.1 mA=2000:1.

(3) When the switching elements $T_A$ and $T_B$ are turned on and the switching element $T_C$ is turned off, the maximal current is 200 mA and the minimal current is acquired as below.

$$1\ mA - (100\ V/110\ k\Omega) - (100\ V/2\ M\Omega) \approx 1\ mA - 0.9\ mA - 0.05\ mA \approx 0.05\ mA$$

Therefore, the ratio of the maximal current to the minimal current is 200 mA:0.05 mA=4000:1.

(4) When all of the switching elements $T_A$ to $T_C$ are turned on, the maximal current is 200 mA and the minimal current is acquired as below.

$$1\ mA - (100\ V/110\ k\Omega) - (100\ V/2\ M\Omega) - (100\ V/2.5\ M\Omega) \approx 1\ mA - 0.9\ mA - 0.05\ mA - 0.04\ mA \approx 0.01\ mA$$

Therefore, the ratio of the maximal current to the minimal current is 200 mA:0.01 mA=20000:1.

In the above examples of (1) to (4), the desired current ratio (ratio of the maximal current to the minimal current) can be realized by connecting the plural bypass lines in parallel to each other and controlling the combination of turning on and turning off for the switching elements $T_A$ to $T_C$. For the use with the current ratio fixed at 2000:1, the pattern of (2) is employed. However, in this case, at least the bypass line including the switching element $T_A$ only has to be present, and the bypass line including the switching element $T_B$ and the bypass line including the switching element $T_C$ may be unnecessary.

According to this embodiment, the insertion of the bypassing circuit 6b in parallel to the LEDs (1 to 5) enables the current i supplied by the LED driving circuit 4 to be branched to the bypassing circuit 6b such that the current $i_{LED}$ to be caused to flow in the LEDs (1 to 5) becomes the target minimal current. Therefore, the ratio of the maximal current to the minimal current to be caused to flow in the LEDs (1 to 5) can be set to be the target ratio regardless of the performance of the LED driving circuit 4 and without any malfunctioning of the LED driving circuit 4 because the operation thereof is not discontinued.

Since bypassing circuit 6b including a resistance is used and the resistance works as a discharge resistance for an abnormal situation and, therefore, the circuit can be protected and the safety can be secured of the LED lighting device 1b or the liquid crystal displaying apparatus incorporating therein the LED lighting device 1b.

(Third Embodiment)

Figure 4:
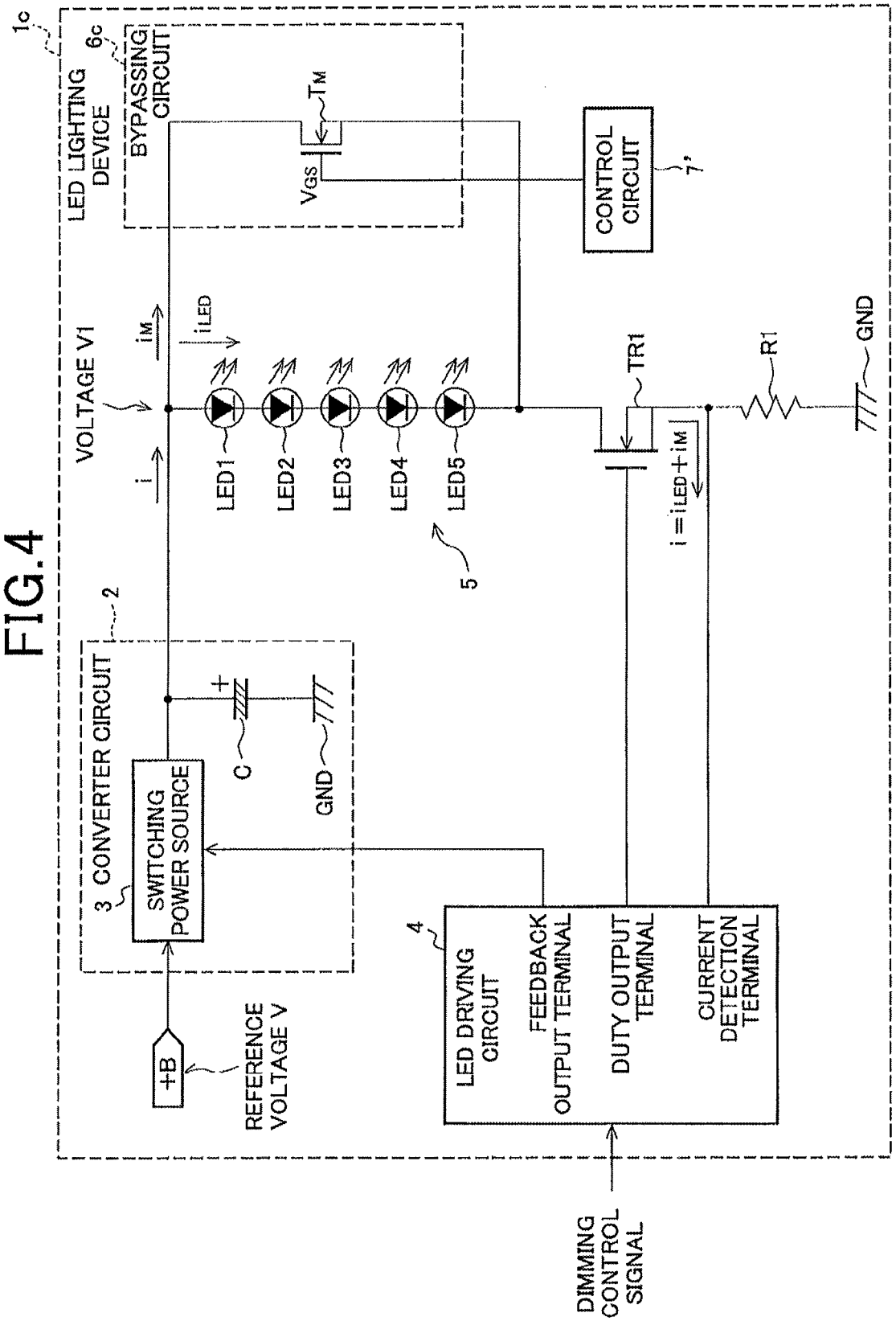
FIG. 4 is a diagram of an exemplary configuration of an LED lighting device according to a third embodiment of the present invention.

FIG. 4 is a diagram of an exemplary configuration of an LED lighting device according to a third embodiment of the present invention. In FIG. 4, "1c" denotes the LED lighting device. The LED lighting device 1c differs from the LED lighting device 100 described above with reference to FIG. 7 in that the LED lighting device 1c includes a bypassing circuit 6c inserted in parallel to the LED circuit 5 and the control circuit 7' that controls the operation of the bypassing circuit 6c. In FIG. 4, components denoted by the same reference numerals as those of the components depicted in FIG. 7 have the same functions as those thereof. An exemplary operation of the LED lighting device 1c will briefly be described.

As above, the LED driving circuit 4 receives the dimming control signal to control the dimming duty ratio to the predetermined dimming duty ratio, from the main control portion (not depicted). The LED driving circuit 4 outputs the duty signal based on the dimming duty ratio from its feedback output terminal to the converter circuit 2, controls turning on and off of the switching power source 3, and causes the switching power source 3 to generate the voltage V1 corresponding to the dimming duty ratio. The LED driving circuit 4 causes the switching element TR1 (corresponding to the switching circuit) inserted between the LED circuit 5 and the ground line GND to be driven for switching based on the duty signal, causes the voltage V1 to continuously be applied to the LED circuit 5, and causes the LEDs (1 to 5) to be turned on. The switching element TR1 is composed of, for example, a field effect transistor (FET).

The converter circuit 2 generates the voltage V1 to turn on the LEDs (1 to 5) included in the LED circuit 5 based, for example, on the reference voltage V generated from the power source voltage (+B) such as a battery. Though the converter circuit 2 is configured as a what-is-called step-down converter including the capacitor C, the converter circuit 2 may be of any one of a step-down, a step-up, and a step-up-and-down types.

The LED circuit 5 includes at least one LED. In the depicted example, the LED circuit 5 includes the five LEDs of LEDs (1 to 5). The electric current i acquired by adding the current $i_{LED}$ flowing in the LEDs (1 to 5) to the current $i_M$ flowing in the bypassing circuit 6c is converted from a current into a voltage by the current detection resistor R1 and this voltage is input into the current detection terminal of the LED driving circuit 4. The LED driving circuit 4 outputs the value of the voltage input into the current detection terminal from its feedback output terminal to the converter circuit 2, and causes the converter circuit 2 to drive the LEDs (1 to 5) each with a constant current.

The LED lighting device 1c of this embodiment includes the LED circuit 5 including the LEDs (1 to 5), the bypassing circuit 6c inserted in parallel to the LED circuit 5, and the LED driving circuit 4 that supplies a current to each of the LED circuit 5 and the bypassing circuit 6c based, for example, on the duty control. When the LED driving circuit 4 causes the predetermined minimal current to flow in the LED circuit 5, the LED driving circuit 4 supplies the current acquired by adding the current caused to flow in the bypassing circuit 6c to this minimal current. The current acquired by the addition is controlled by the switching element TR1 connected in series to the LED circuit 5 and the bypassing circuit 6c.

The current supplied by the LED driving circuit 4 is branched to the bypassing circuit 6c such that the value of the current to be caused to flow in the LEDs (1 to 5) becomes the target value that is the value of the minimal current acquired when the ratio of the maximal current to the minimal current to be caused to flow in the LEDs (1 to 5) become the predetermined ratio (also referred to as "target ratio"). The target ratio only has to be determined corresponding to the contrast ratio desired to be realized, the specification of the LED, etc., and is not especially limited while the target ratio may be, for example, 2000:1.

In the above, the LED driving circuit 4 controls turning on and off of the switching power source 3 based on the externally-input dimming control signal (the dimming duty ratio), and supplies the current i based on the voltage V1 that corresponds to the dimming duty ratio. The current i is branched at the connection point of the LEDs (1 to 5) and the bypassing circuit 6c. The currents $i_{LED}$ and $i_M$ respectively flow in the LEDs (1 to 5) and the bypassing circuit 6c. In this example, the case where the LED driving circuit 4 supplies the current based on the duty control is exemplified and described. However, not limited to this duty control, the same control can be executed even in the case, for example, where current control is applied.

An exemplary configuration of the bypassing circuit 6c will be described. The bypassing circuit 6c is composed of: a semiconductor element such as a field-effect transistor (FET) or, more preferably, a metal-oxide-semiconductor field-effect transistor (MOSFET) that is a type of FET; etc. In the example of FIG. 4, the description will be made assuming that the bypassing circuit 6c is composed of an FET element $T_M$.

Representing the current output from the LED driving circuit 4 as "i", the current flowing in the LEDs (1 to 5) as "$i_{LED}$", and a current flowing in the bypassing circuit 6c as "$i_M$", an equation as below holds.

$$i = i_{LED} i_M, \text{ where } i_M = gm \cdot V_{GS} \qquad \text{Eq. (3)}$$

"gm" represents trans-conductance and $V_{GS}$ represents the gate-source voltage of the FET element $T_M$.

The control circuit 7' is connected to the FET element $T_M$, and controls turning on and off (operation and discontinuation of the operation) of the FET element $T_M$ and the gate-source voltage $V_{GS}$ to be applied to the FET element $T_M$. For example, when the FET element $T_M$ is turned on, the current flowing in the LEDs (1 to 5) is acquired as $i_{LED} = i - i_M$ from Eq. (3). The current $i_M$ flowing in the bypassing circuit 6c is controlled by the gate-source voltage $V_{GS}$ of the FET element $T_M$. When the FET element $T_M$ is turned off, the current flowing in the LEDs (1 to 5) is $i_{LED} = i$.

In FIG. 4, the case is assumed, for example, where the target ratio of the maximal current to the minimal current to be caused to flow in the LEDs (1 to 5) is 2000:1 and the maximal current (the rated current) is 250 mA. In this case, the target value of the minimal current is 0.125 mA. When the minimal current is caused to flow, it is assumed, for example, that control, is executed to turn on the FET element $T_M$. When the minimal current is caused to flow, the relation $i_{LED} = i - i_M$ holds. As depicted in FIG. 8, as to the performance of the LED driving circuit 4 in this example, the operation thereof is not guaranteed when the dimming duty is equal to or lower than 0.1%, and 0.200 mA is supplied to the LEDs (1 to 5) when the dimming duty is, for example, 0.1%. With this performance of the LED driving circuit 4, the target value of the minimal current that is 0.125 mA cannot be achieved.

Assuming that i and $i_{LED}$ are i=0.200 mA and $i_{LED}$=0.125 mA in Eq. (3) above, the current $i_M$ to be caused to flow in the FET element $T_M$ is 0.075 mA. The gate-source voltage $V_{GS}$ necessary for causing this current $i_M$ to flow can be acquired based on a control function described with reference to FIG. 6. The voltage V1 is the voltage applied across the FET element $T_M$ (and the LED circuit 5) and is known. In this manner, of the current i (=0.200 mA) supplied by the LED driving circuit 4, only the current $i_M$ (=0.075 mA) can be branched to the FET element $T_M$ by turning on the FET element $T_M$ and, thereby, executing the control of the gate-source voltage $V_{GS}$. Therefore, the target minimal current $i_{LED}$ (=0.125 mA) can be caused to flow in the LEDs (1 to 5).

When the maximal current (for example, 250 mA) is caused to flow in the LEDs (1 to 5), control is executed to turn off the FET element $T_M$. No current flows in the FET element $T_M$ and, therefore, the relation $i_{LED} = i$ holds. Therefore, the LED driving circuit 4 only has to supply the maximal current as it is. Thereby, the target maximal current $i_{LED}$ (=250 mA) flows in the LEDs (1 to 5).

When the bypassing circuit 6c is composed only of resistors, a current always flows in the bypassing circuit 6c. Therefore, even when the maximal current is caused to flow in the LEDs (1 to 5), the LED driving circuit 4 needs to supply a current acquired by adding a current to be supplied to the bypassing circuit 6c to the maximal current and, the added current is lost. In contrast, in this embodiment, the bypassing circuit 6c is composed of the FET element. Therefore, when the maximal current is caused to flow in the LEDs (1 to 5), no current can be caused to flow in the FET element by turning off the FET element. Thereby, the LED driving circuit 4 only has to supply the maximal current as it is and, therefore, the above loss does not occur.

Figure 5:
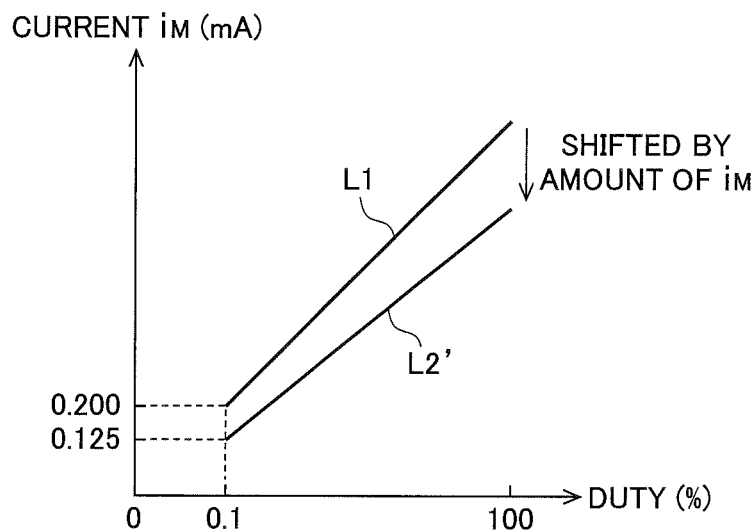
FIG. 5 is a diagram of another example of the correspondence relation between the current flowing in the LED and the dimming duty.

FIG. 5 is a diagram of another example of the correspondence relation between the current flowing in the LEDs and the dimming duty. The axis of ordinate therein represents the current flowing in the LEDs (unit: mA) and the axis of abscissa therein represents the dimming duty (%). The graph L1 is the same as that for the traditional case described above with reference to FIG. 8. A graph L2' shows the correspondence relation between the current flowing in the LEDs (1 to 5) and the dimming duty in the circuit configuration of this embodiment, and is acquired by shifting the graph L1 to be lower by the amount of the current $i_M$. According to the circuit configuration of this embodiment, as above, of the current i supplied by the LED driving circuit 4, only the current $i_M$ can be branched to the FET element $T_M$. Therefore, the ratio of the maximal current to the minimal current of the current $i_{LED}$ to be caused to flow in the LEDs (1 to 5) can be set to be the target ratio (for example, 2000:1).

Figure 6:
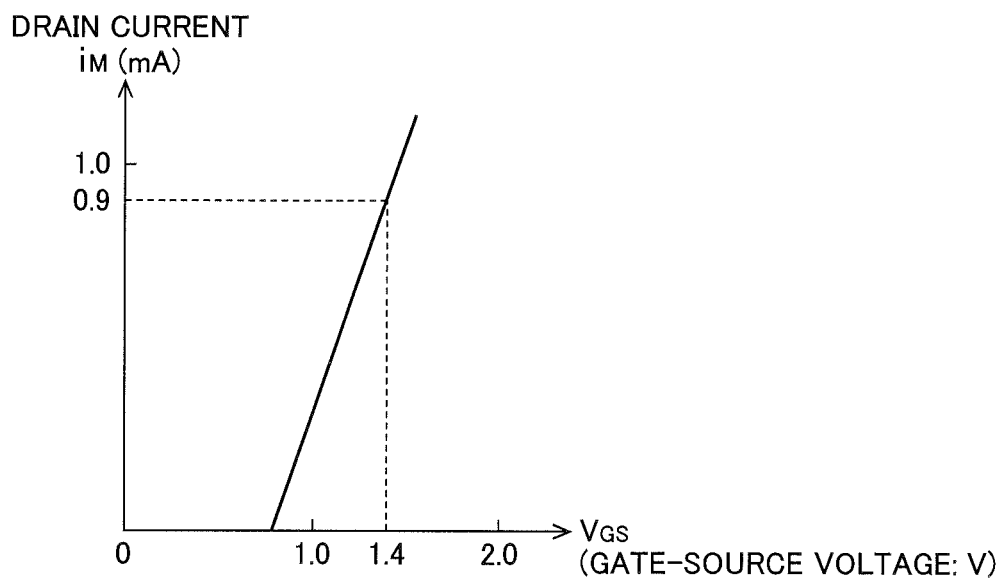
FIG. 6 is a diagram of an example of a control function expressing the relation between a gate-source voltage and a current of a semiconductor device.

FIG. 6 is a diagram of an example of the control function expressing the relation between the gate-source voltage and the current of a semiconductor device. Another example of this embodiment will be described with reference to FIG. 4. In this example, for an ordinary state, it is assumed that the maximal current of the current $i_{LED}$ flowing in the LEDs (1 to 5) is, for example, 200 mA and the minimal current controllable by the LED driving circuit 4 is, for example, 1 mA.

It is also assumed that the target ratio of the maximal current to the minimal current of the current $i_{LED}$ to be caused to flow in the LEDs (1 to 5) is 2000:1. In this example, the maximal current is 200 mA and, therefore, the minimal current to be caused to flow in the LEDs (1 to 5) is 0.1 mA. Therefore, $i_M$ is $i_M = i - i_{LED}$ from Eq. (3) above and, therefore, the current $i_M$ to be caused to flow in the FET element $T_M$ is acquired as $i_M$=1 mA−0.1 mA=0.9 mA. The gate-source voltage $V_{GS}$ to realize this $i_M$=0.9 mA can be acquired from the control function of FIG. 6. The gate-source voltage $V_{GS}$ is acquired as $V_{GS}$=1.4 V for $i_M$=0.9 mA.

The control circuit 7' applies 1.4 V as the gate-source voltage $V_{GS}$ acquired as above, to the FET element $T_M$. Thereby, the current $i_M$ of 0.9 mA flows in the FET element $T_M$. Of the minimal current i (=1 mA) supplied by the LED driving circuit 4, only the current $i_M$ (=0.9 mA) can be branched to the FET element $T_M$ and the minimal current $i_{LED}$ (=0.1 mA) can be caused to flow in the LEDs (1 to 5).

As above, the desired current ratio (the ratio of the maximal current to the minimal current) such as 2000:1 can be realized by controlling the gate-source voltage of the FET element $T_M$.

As above, according to this embodiment, the insertion of the bypassing circuit 6c in parallel to the LEDs (1 to 5) enables the current i supplied by the LED driving circuit 4 to be branched to the bypassing circuit 6c such that the current $i_{LED}$ to be caused to flow in the LEDs (1 to 5) becomes the target minimal current. Therefore, the ratio of the maximal current to the minimal current caused to flow in the LEDs (1 to 5) can be set to be the target ratio regardless of the performance of the LED driving circuit 4 and without any malfunctioning of the LED driving circuit 4 because the operation thereof is not discontinued.

EXPLANATIONS OF LETTERS OR NUMERALS 1a to 1c and 100 . . . LED lighting device, 2 . . . converter circuit, 3 . . . switching power source, 4 . . . LED driving circuit, 5 . . . LED circuit, 6a to 6c . . . bypassing circuit, and 7 and 7' . . . control circuit.

The invention claimed is:

1. An LED lighting device comprising:
an LED circuit that comprises at least one LED;
a bypassing circuit that is inserted in parallel to the LED circuit; and
an LED driving circuit that supplies a current to each of the LED circuit and the bypassing circuit, wherein
when a predetermined current is caused to flow in the LED circuit, the LED driving circuit supplies a current acquired by adding the current to flow in the bypassing circuit to the predetermined current, and wherein
the current acquired by the addition is controlled by a switching circuit connected in series to the LED circuit, wherein a predetermined maximal and a predetermined minimal currents to be caused to flow in the LED circuit have a predetermined ratio.

2. An LED lighting device comprising:
an LED circuit that comprises at least one LED;
a bypassing circuit that is inserted in parallel to the LED circuit; and
an LED driving circuit that supplies a current to each of the LED circuit and the bypassing circuit, wherein
when a predetermined current is caused to flow in the LED circuit, the LED driving circuit supplies a current acquired by adding the current to flow in the bypassing circuit to the predetermined current, and wherein
the current acquired by the addition is controlled by a switching circuit connected in series to the LED circuit and the bypassing circuit, wherein a predetermined maximal and a predetermined minimal currents to be caused to flow in the LED circuit have a predetermined ratio.

3. The LED lighting device as defined in claim 2, wherein when a predetermined maximal current is caused to flow in the LED circuit, the LED driving circuit supplies a current acquired by adding the current to flow in the bypassing circuit to the predetermined maximal current.

4. The LED lighting device as defined in claim 2, wherein the bypassing circuit is a resistor.

5. The LED lighting device as defined in claim 2, wherein the bypassing circuit comprises at least one bypass line having therein a resistor and another switching circuit connected in series to each other, and wherein
when the predetermined current is caused to flow in the LED circuit, the other switching circuit is caused to operate and the LED driving circuit supplies a current acquired by adding the current to flow in the bypassing circuit to the predetermined current.

6. The LED lighting device as defined in claim 5, wherein when a predetermined maximal current is caused to flow in the LED circuit, the other switching circuit is caused to stop operation and the LED driving circuit supplies the predetermined maximal current.

7. The LED lighting device as defined in claim 5, wherein the bypassing circuit comprises the plurality of bypass lines connected in parallel to each other.

8. The LED lighting device as defined in claim 2, wherein the bypassing circuit comprises a semiconductor element, and wherein
when the predetermined current is caused to flow in the LED circuit, the semiconductor element is caused to operate and the LED driving circuit supplies a current acquired by adding the current to flow in the bypassing circuit to the predetermined current.

9. The LED lighting device as defined in claim 8, wherein when the predetermined maximal current is caused to flow in the LED circuit, the semiconductor element is caused to stop operation and the LED driving circuit supplies the predetermined maximal current.

10. The LED lighting device as defined in claim 8, wherein the semiconductor element is a field-effect transistor, and wherein
the current to flow in the bypassing circuit is controlled by controlling a gate-source voltage of the field-effect transistor.

11. The LED lighting device as defined in claim 2, wherein the LED driving circuit supplies a current through duty control.

* * * * *